United States Patent Office 3,063,984
Patented Nov. 13, 1962

3,063,984
CYCLOPENTANOPHENANTHRENE COMPOUNDS AND PROCESS
John A. Zderic, Mexico City, Mexico, assignor, by mesne assignments, to Syntex Corporation, a corporation of Panama
No Drawing. Filed Dec. 15, 1960, Ser. No. 75,945
21 Claims. (Cl. 260—239)

The present invention relates to novel cyclopentanophenanthrene compounds and to a process for the production thereof.

More particularly the present invention relates to 11a-aza-C-homo progestational hormones and more specifically to 11a-aza-C-homo-$\Delta^4$-pregnene-3,20-dione, to 11a-aza-C-homo-$\Delta^{1,4}$-pregnadiene-3,20-dione, and to N-acylated and N-alkylated derivatives thereof as well as to quaternary ammonium salts thereof.

The novel compounds of the present invention which are progestational agents exhibiting anti-androgenic, anti-estrogenic, anti-gonadotrophic and anti-ovulatory activities as well as hypotensive properties are represented by the following formulas:

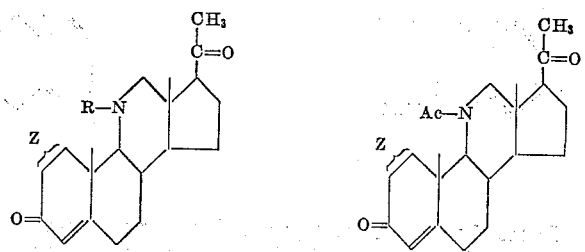

In the above formulas Z indicates a double bond or a saturated linkage between C–1 and C–2, R represents hydrogen, an alkyl or an aralkyl group containing up to 12 carbon atoms and Ac represents the acyl radical of a hydrocarbon carboxylic acid of less than 12 carbons saturated or unsaturated, of straight, branched, cyclic or cyclic-aliphatic chain or aromatic. The acyl radical is preferably the acetyl or a lower alkanoyl radical.

The novel compounds of the present invention may be prepared by a process illustrated by the following equation:

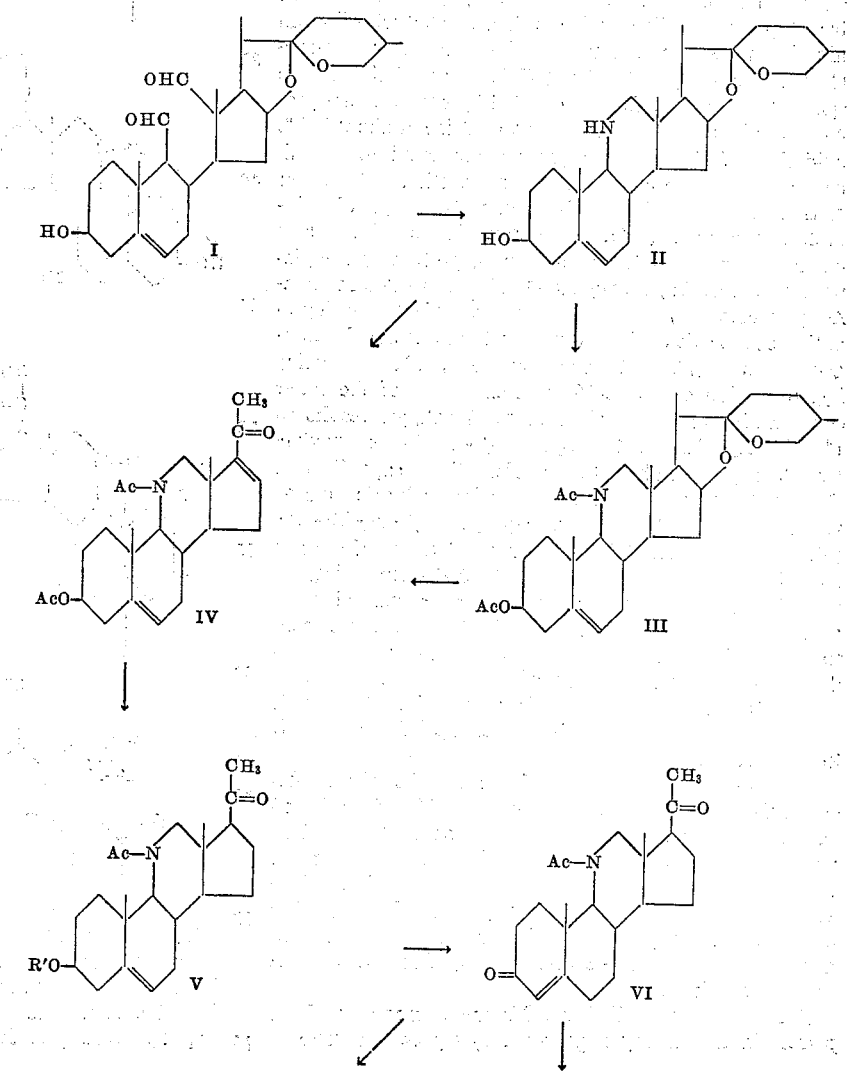

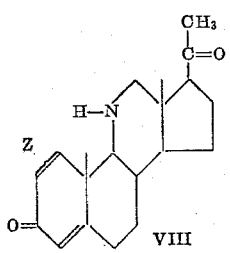

VIII

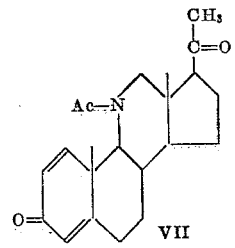

VII

In the above formulas Ac and Z have the same meaning as set forth above and R' represents hydrogen or a hydrocarbon carboxylic acyl radical.

In practicing the process outlined above, the starting compound, 11,12-seco-22-$\Delta^5$-spirosten-3β-ol-11,12-dial (I) is prepared by treating $\Delta^5$-22a-spirosten-3β,12β-diol-11-one (disclosed by Rothman and Wall in J. Am. Chem. Soc. 79, 3228 (1957)) with lithium aluminum hydride to form 11β,12β-dihydroxy-diosgenin, which, upon reaction with lead tetraacetate in an inert solvent such as benzene is converted into the 11,12-seco-22a-$\Delta^5$-spirosten-3β-ol-11,12-dial (I). The dialdehyde is then reacted with ammonia in ethanol solution thereby yielding a Schiff base type intermediate which is then reacted with lithium aluminum hydride in tetrahydrofuran to form 11a-aza-C-homo-22a-$\Delta^5$-spirosten-3β-ol (II). Degradation of the spiroketal side chain is then effected by conventional procedure as by reaction with acetic anhydride at about 200°, oxidation of the resulting pseudo-compound to the diosone and alkaline hydrolysis and acetylation of the latter thus forming 11a-N-acetyl-C-homo-$\Delta^{5,16}$-pregnadien-3β-ol-20-one acetate (IV). The degradation of the side chain may be preceded by acylation, preferably acetylation, thus forming 3β-acyloxy-11a-N-acetyl-C-homo-22a-$\Delta^5$-spirostene (III) which may then be subjected to degradation of the side chain to form the 11a-N-acetyl-C-homo-$\Delta^{5,16}$-pregnadien-3β-ol-20-one acylate (IV). Selective hydrogenation of the C-16,17-double bond of the latter compound over a palladium-charcoal catalyst results in 11a-N-acetyl-C-homo-$\Delta^5$-pregnen-3β-ol-20-one acylate (V:R'=acyl) which is then preferentially saponified at C-3 by treatment with methanolic hydrochloric acid to afford 11a-N-acetyl-C-homo-$\Delta^5$-pregnen-3β-ol-20-one (V:R'=hydrogen). The 3β-hydroxy-$\Delta^5$-group of the last named compound is converted to the $\Delta^4$-3-keto moiety by oxidizing under Oppenauer conditions or with chromic acid in acetone solution followed by treatment with acid to thus form 11a-N-acetyl-C-homo-$\Delta^4$-pregnene-3,20-dione (VI). Upon reaction with methanolic potassium hydroxide, the acetyl group is removed and there is formed 11a-aza-C-homo-$\Delta^4$-pregnene-3,20-dione (VIII: Z=saturated linkage).

For introduction of a double bond at C-1,2, the 11a-N-acetyl-C-homo-$\Delta^4$-pregnene-3,20-dione (VI) is refluxed with selenium dioxide in a solvent such as t-butanol in the presence of catalytic amounts of pyridine to form the corresponding 1-dehydro compound, 11a-N-acetyl-C-homo-$\Delta^{1,4}$-pregnadiene-3,20-dione (VII). Upon reaction with methanolic potassium hydroxide, the 11a-aza-C-homo-$\Delta^{1,4}$-pregnadiene-3,20-dione (VIII: Z=double bond) is obtained.

The novel 11a-N-alkylated-C-homo compounds of the present invention may be prepared by a process illustrated by the following equation:

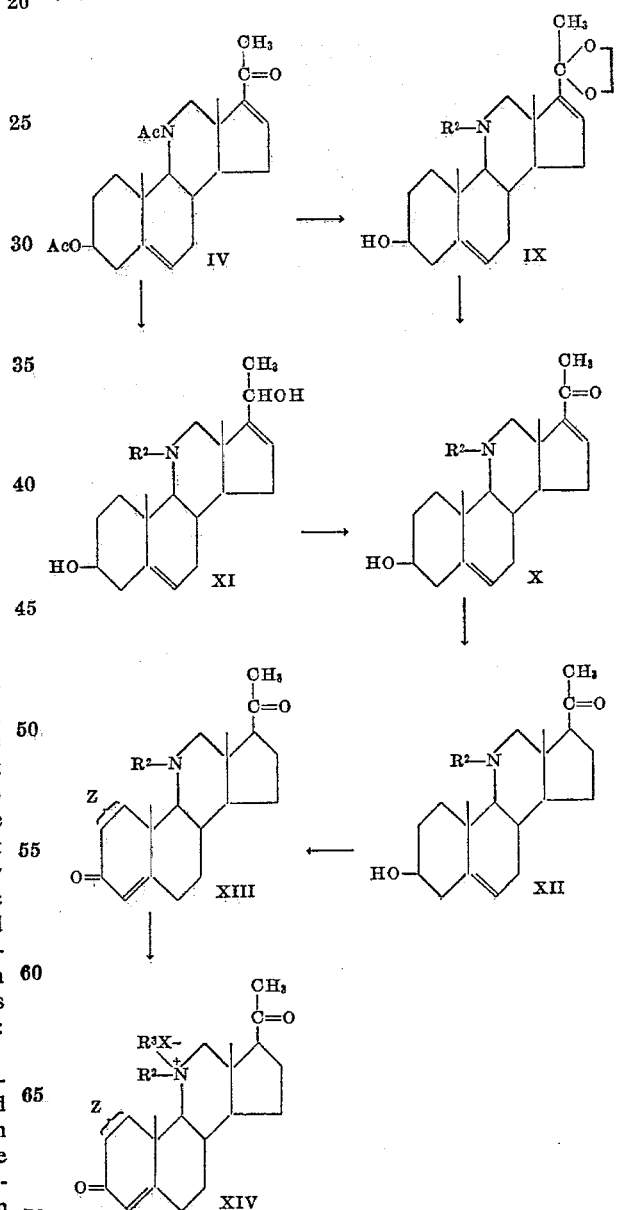

In the above formulas, $R^2$ represents an alkyl or aralkyl group containing up to 12 carbon atoms; $R^3$ represents a lower alkyl group; X represents a halogen such as iodine, bromine or chlorine and Z and Ac have the same meaning as previously set forth.

In practicing the process outlined above 11a-N-acyl-C-homo-Δ⁵,¹⁶-pregnadien-3β-ol-20-one acylate, preferably 11a-N-acetyl-C-homo-Δ⁵,¹⁶-pregnadien-3β-ol-20-one acylate (IV) is refluxed with lithium aluminum hydride in tetrahydrofuran for 5 hours to form 11a-N-ethyl-C-homo-Δ⁵,¹⁶-pregnadiene-3β,20-diol (XI) which upon reaction with manganese dioxide in chloroform at room temperature affords 11a-N-ethyl-C-homo-Δ⁵,¹⁶-pregnadien-3β-ol-20-one (X). The latter compound can also be formed by first protecting the keto group of 11a-N-acetyl-C-homo-Δ⁵,¹⁶-pregnadien-3β-ol-20-one acylate (IV) by formation of the cyclic ethylene ketal thereof by conventional methods, followed by reduction with lithium aluminum hydride to produce the cyclic ethylene ketal of 11a-N-ethyl-C-homo-Δ⁵,¹⁶-pregnadien-3β-ol-20-one (IX) which is then hydrolyzed with acid to form 11a-N-ethyl-C-homo-Δ⁵,¹⁶-pregnadien-3β-ol-20-one (X). The latter compound is converted to 11a-N-ethyl-C-homo-Δ⁵-pregnen-3β-ol-20-one (XII) by hydrogenation in the presence of a hydrogenation catalyst such as palladium, and, upon oxidation under Oppenauer conditions there is formed 11a-N-ethyl-C-homo-Δ⁴-pregnene-3,20-dione (XIII: Z=saturated linkage). A double bond may then be introduced at C-1,2 by reaction with selenium dioxide to afford the 1-dehydro compound (XIII: Z=double bond). The quaternary ammonium salt of the latter compound is prepared by conventional methods, as for example, the N-ethyl compound (XIII) is reacted with an alkyl or an aralkyl halide in a solvent such as notroalkane to thus form the quaternary ammonium halide derivative (XIV).

Other N-acylated and N-alkylated compounds are prepared by substituting for the N-acetyl group other acyl groups of the type mentioned previously. Thus there are obtained N-acylated and N-alkylated compounds containing up to 12 carbon atoms such at N-propionyl, N-benzoyl, N-butyryl and the corresponding N-propyl, N-benzyl and N-butyl derivatives.

The following examples serve to illustrate but are not intended to limit the scope of the invention:

*Example I*

A solution of 10 g. of Δ⁵-22a-spirosten-3β,12β-diol-11-one-diacetate (Rothman and Wall, J. Am. Chem. Soc. 79, 3228 (1957)) in 300 ml. of anhydrous tetrahydrofuran was added dropwise to a suspension of 10 g. of lithium aluminum hydride in 1 liter of anhydrous tetrahydrofuran while stirring and the resulting mixture was refluxed for 30 minutes. Acetone was added cautiously to decompose the excess of the hydride, then treated with saturated aqueous sodium sulfate, finally with anhydrous sodium sulfate, the solid was filtered and the filtrate evaporated to dryness. The residue was triturated with hexane yielding 11β,12β-dihydroxy-diosgenin.

To a mixture of 8.1 g. of 11β,12β-dihydroxy-diosgenin, 140 ml. of glacial acetic acid and 210 ml. of thiophene-free benzene, 12.1 g. of lead tetraacetate were added and the mixture was stirred at room temperature for 5 minutes. 200 ml. of water containing 100 g. of sodium acetate and 4 g. of sodium iodide were added, the color was discharged by the addition of 80 ml. of saturated aqueous sodium thiosulfate solution and the product extracted twice, using each time 200 ml. of ethyl acetate. The pooled extracts were washed with aqueous sodium bicarbonate and water, dried over anhydrous sodium sulfate and evaporated to dryness. The residue was crystallized from a mixture of 60 ml. of methanol and 12.5 ml. of water to afford 11,12-seco-22a-Δ⁵-spirosten-3β-ol-11,12-diol.

A mixture of 5 g. of the dialdehyde and 250 ml. of ammonia-saturated ethanol was refluxed during 10 hours. Upon evaporation of the solvent, a crystalline residue was obtained which was refluxed with 2.5 g. of lithium aluminum hydride in mixture with 250 ml. of tetrahydrofuran during 20 hours. The excess of hydride was then decomposed by careful addition of acetone, then a small amount of saturated aqueous sodium sulfate solution and finally solid anhydrous sodium sulfate were added. The solid was collected by filtration and the filtrate evaporated to dryness under reduced pressure. Crystallization from aqueous ethanol yielded 11a-aza-C-homo-22a-Δ⁵-spirosten-3β-ol.

*Example II*

4 g. of the latter compound was heated with 20 ml. of acetic anhydride in a sealed tube at 200° C. for 55 minutes; it was then cooled, the excess of anhydride was hydrolyzed by the addition of 8 ml. of water and the mixture was treated with 2 g. of chromium trioxide in 25 ml. of 80% acetic acid; after stirring for three hours at room temperature, the mixture was diluted with water, extracted with ether and the extract was washed with water, dried over anhydrous sodium sulfate and the ether was evaporated. The residue was mixed with 200 ml. of 60% acetone containing 2 g. of potassium hydroxide and refluxed for 5 hours, then concentrated to a small volume, cooled, diluted with water and extracted with ether. The extract was washed several times with water, dried over anhydrous sodium sulfate and evaporated to dryness. Upon conventional acetylation, followed by recrystallization from acetone-hexane, there was obtained 3β-acetoxy-11a-N-acetyl-C-homo-Δ⁵,¹⁶-pregnadien-20-one.

*Example III*

2 g. of 11a-aza-C-homo-22a-spirosten-3β-ol (described in Example I) was treated with 2 ml. of acetic anhydride in 10 ml. of pyridine at room temperature. The mixture was allowed to stand overnight and was then diluted with water, the solid was collected by filtration, washed with water, dried and recrystallized from acetone-hexane thus affording 3β-acetoxy-11a-N-acetyl-C-homo-22a-Δ⁵-spirosten. The latter compound was then treated with acetic anhydride at 200°, the resulting pseudo-sapogenin was oxidized to the diosone and was then treated with potassium hydroxide followed by reesterification as described in Example II to thus yield 3β-acetoxy-11a-N-acetyl-C-homo-Δ⁵,¹⁶-pregnadien-20-one, identical with the compound obtained in Example II.

*Example IV*

A solution of 1.25 g. of 3β-acetoxy-11a-N-acetyl-C-homo-Δ⁵,¹⁶-pregnadien-20-one in 50 cc. of ethyl acetate was hydrogenated at room temperature and atmospheric pressure using 200 mg. of prereduced 10% palladium on charcoal catalyst, until 1 molar equivalent of hydrogen was absorbed, the catalyst was filtered and the filtrate evaporated to a small volume. Addition of methanol gave the crystalline 3β-acetoxy-11a-N-acetyl-C-homo-Δ⁵-pregnen-20-one.

A solution of 1 g. of the above compound in 25 cc. of 2.5% methanolic solution of perchloric acid was kept at room temperature for 18 hours, it was then diluted with water, the formed precipitate collected by filtration, washed with water, dried and recrystallized from acetone-hexane, thus giving 11a-N-acetyl-C-homo-Δ⁵-pregnen-3β-ol-20-one.

1 g. of the latter compound was dissolved in 10 cc. of acetone, cooled to 0° C., flushed with nitrogen and treated under stirring with 8 N chromic acid solution added in a thin stream, at 0° C., until the red color of chromium trioxide persisted in the mixture. (The 8 N solution of chromic acid was prepared by dissolving 26.7 g. of chromium trioxide in 23 cc. of concentrated sulfuric acid and diluting with water to 100 cc.) The reaction mixture was stirred for 5 minutes further, diluted with water and the product collected by filtration, washed with water and dried under vacuum.

The crude product was dissolved in 40 cc. of methanol and treated at room temperature with a solution of 0.1 g. of oxalic acid in 1 cc. of water. The mixture was kept standing for 3 hours, then diluted with water and the product was collected by filtration, washed with water to neutral and dried. There was thus obtained 11a-N-acetyl-C-homo-$\Delta^4$-pregnene-3,20-dione.

A stirred mixture of 500 mg. of the above compound, 25 cc. of t-butanol, 200 mg. of selenium dioxide and 0.15 cc. of pyridine was refluxed for 48 hours under an atmosphere of nitrogen, filtered through celite, and the filtrate was evaporated to dryness under reduced pressure. The residue was dissolved in acetone, treated with decolorizing charcoal, refluxed for 1 hour, filtered and the acetone was evaporated. The residue was purified by chromatography on neutral alumina and the solid eluates were crystallized from acetone-hexane, thus giving 11a-N-acetyl-C-homo-$\Delta^{1,4}$-pregnadiene-3,20-dione.

*Example V*

1 g. of 11a-N-acetyl-C-homo-$\Delta^4$-pregnene-3,20-dione, obtained as described in the preceding example was refluxed for 48 hours under an atmosphere of nitrogen with 50 cc. of 4% methanolic potassium hydroxide solution and then neutralized with acetic acid. Part of the solvent was removed under reduced pressure, water added and then extracted with methylene chloride, the organic extract washed to neutral, dried over anhydrous sodium sulfate and evaporated to dryness. Chromatography of the residue gave the pure 11a-aza-C-homo-$\Delta^4$-pregnene-3,20-dione.

In a similar manner, 11a-N-acetyl-C-homo-$\Delta^{1,4}$-pregnadiene-3,20-dione was converted into 11a-aza-C-homo-$\Delta^{1,4}$-pregnadiene-3,20-dione.

*Example VI*

A solution of 5 g. of 3$\beta$-acetoxy-11a-N-acetyl-C-homo-$\Delta^{5,16}$-pregnadien-20-one, obtained as described in Example II, in 150 cc. of anhydrous tetrahydrofuran was added dropwise to a suspension of 5 g. of lithium aluminum hydride in 300 cc. of anhydrous tetrahydrofuran and the mixture refluxed for 30 hours with stirring. Acetone was added cautiously to decompose the excess of hydride, then saturated aqueous sodium sulfate solution and finally solid anhydrous sodium sulfate were added. The solid was filtered and washed well with hot ethyl acetate, and the filtrate and washings were evaporated to dryness under reduced pressure. Crystallization of the residue from acetone-hexane gave 11a-N-ethyl-C-homo-$\Delta^{5,16}$-pregnadiene-3$\beta$,20-diol.

A solution of 3 g. of the above compound in 300 cc. of chloroform, distilled over calcium chloride was stirred for 18 hours at room temperature with 30 g. of freshly precipitated manganese dioxide. The inorganic material was filtered, washed with hot chloroform and the solution evaporated; the residue crystallized on trituration with hexane. Recrystallization from acetone-hexane gave 11a-N-ethyl-C-homo-$\Delta^{5,16}$-pregnadien-3$\beta$-ol-20-one.

A solution of 2 g. of the above compound in 80 cc. of ethyl acetate was hydrogenated at room temperature and atmospheric pressure using 400 mg. of 10% palladium on charcoal catalyst, in accordance with the method of Example IV. There was thus obtained 11a-N-ethyl-C-homo-$\Delta^5$-pregnen-3$\beta$-ol-20-one.

A solution of 1 g. of the latter compound in 80 cc. of toluene and 20 cc. of cyclohexanone was dried by distilling off 10 cc. of solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated until crystallization started. There was thus obtained 11a-N-ethyl-C-homo-$\Delta^4$-pregnene-3,20-dione.

Selenium dioxide oxidation of the above compound, by following the method of Example IV, gave 11a-N-ethyl-C-homo-$\Delta^{1,4}$-pregnadiene-3,20-dione.

*Example VII*

A mixture of 2 g. of 3$\beta$-acetoxy-11a-N-acetyl-C-homo-$\Delta^{5,16}$-pregnadien-20-one, 20 cc. of dry benzene, 16 cc. of ethylene glycol and 300 mg. of p-toluenesulfonic acid monohydrate was refluxed for 8 hours, using a Dean-Stark water separator. The cooled reaction solution was washed with 5% aqueous sodium bicarbonate and water to neutral, dried over anhydrous sodium sulfate and the solvent was evaporated. Crystallization of the residue from acetone-ether afforded 20-ethylenedioxy-11a-N-acetyl-C-homo-$\Delta^{5,16}$-pregnadien-3$\beta$-ol-acetate.

By following the reduction method of the preceding example, the above compound was reduced with lithium aluminum hydride in tetrahydrofuran, thus giving 20-ethylenedioxy-11a-N-ethyl-C-homo-$\Delta^{5,16}$-pregnadien-3$\beta$-ol.

A solution of 1 g. of the latter compound in 50 cc. of acetone was treated with 20 mg. of p-toluenesulfonic acid monohydrate and the mixture kept at room temperature for 16 hours, poured into dilute sodium carbonate solution and the solid collected by filtration. Crystallization from acetone-hexane gave 11a-N-ethyl-C-homo-$\Delta^{5,16}$-pregnadien-3$\beta$-ol-20-one, identical with the intermediate of Example VI.

*Example VIII*

A solution of 200 mg. of 11a-N-ethyl-C-homo-$\Delta^4$-pregnene-3,20-dione in 20 cc. of nitromethane was treated with 2 g. of methyl iodide and heated in a sealed tube at 100° C. for 3 hours concentrated almost to dryness, diluted with a little cold ether and the precipitate was collected by filtration, thus giving the methoiodide of 11a-N-ethyl-C-homo-$\Delta^4$-pregnadiene-3,20-dione.

In a similar manner, 11a-N-ethyl-C-homo-$\Delta^{1,4}$-pregnadiene-3,20-dione was converted into the methoiodide of 11a-N-ethyl-C-homo-$\Delta^{1,4}$-pregnadiene-3,20-dione.

I claim:

1. A compound of the following formula:

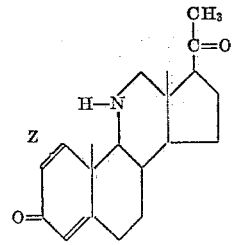

wherein Z is selected from the group consisting of a double bond between C–1 and C–2 and a saturated linkage between C–1 and C–2.

2. 11a-aza-C-homo-$\Delta^4$-pregnen-3,20-dione.
3. 11a-aza-C-homo-$\Delta^{1,4}$-pregnadiene-3,20-dione.
4. A compound of the following formula:

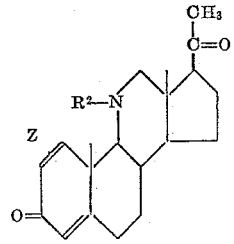

wherein $R^2$ is selected from the group consisting of alkyl and aralkyl containing up to 12 carbon atoms and Z is selected from the group consisting of a double bond between C–1 and C–2 and a saturated linkage between C–1 and C–2.

5. 11a-N-ethyl-C-homo-$\Delta^4$-pregnene-3,20-dione.
6. 11a-N-ethyl-C-homo-$\Delta^{1,4}$-pregnadiene-3,20-dione.

7. The lower alkyl quaternary ammonium salts of a compound of the following formula:

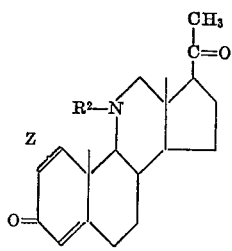

wherein $R^2$ is selected from the group consisting of alkyl and aralkyl containing up to 12 carbon atoms and Z is selected from the group consisting of a double bond between C–1 and C–2 and a saturated linkage between C–1 and C–2.

8. The methoiodide of 11a-N-ethyl-C-homo-$\Delta^4$-pregnene-3,20-dione.

9. The methoiodide of 11a-N-ethyl-C-homo-$\Delta^{1,4}$-pregnadiene-3,20-dione.

10. A compound of the following formula:

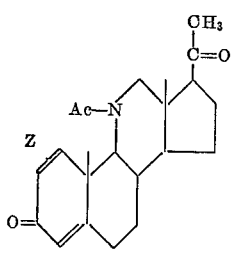

wherein Ac represents a hydrocarbon carboxylic acyl group of less than 12 carbon atoms and Z is selected from the group consisting of a double bond between C–1 and C–2 and a saturated linkage between C–1 and C–2.

11. 11a-N-acetyl-C-homo-$\Delta^4$-pregnene-3,20-dione.

12. 11a-N-acetyl-C-homo - $\Delta^{1,4}$ - pregnadiene - 3,20-dione.

13. A compound of the following formula:

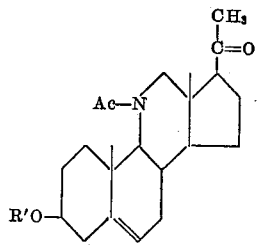

wherein Ac represents a hydrocarbon carboxylic acyl group of less than 12 carbon atoms; and R' is selected from the group consisting of hydrogen and a hydrocarbon carboxylic acyl group of less than 12 carbon atoms.

14. 11a-N-acetyl-C-homo-$\Delta^5$-pregnen-3$\beta$-ol-20-one.

15. 11a-N-acetyl-C-homo - $\Delta^5$ - pregnen-3$\beta$-ol-20-one acetate.

16. 11a-N-acetyl-C-homo - $\Delta^{5,16}$ - pregnadien-3$\beta$-ol-20-one acetate.

17. 11a-N-ethyl-C-homo - $\Delta^{5,16}$ - pregnadien-3$\beta$-ol-20-one.

18. 11a-N-ethyl-C-homo-$\Delta^5$-pregnen-3$\beta$-ol-20-one.

19. 11a-aza-C-homo-22a-$\Delta^5$-spirosten-3$\beta$-ol.

20. 11,12-seco-22a-$\Delta^5$-spirosten-3$\beta$-ol-11,12-dial.

21. 11a-N-acetyl-C-homo-22a - $\Delta^5$ - spirosten - 3$\beta$ - ol-acetate.

References Cited in the file of this patent
UNITED STATES PATENTS

| | | |
|---|---|---|
| 2,806,028 | Mazur | Sept. 10, 1957 |
| 2,806,029 | Mazur | Sept. 10, 1957 |

UNITED STATES PATENT OFFICE
Certificate of Correction

Patent No. 3,063,984                                  November 13, 1962

John A. Zderic

It is hereby certified that error appears in the above numbered patent requiring correction and that the said Letters Patent should read as corrected below.

Column 2, lines 2 to 12, the formulas should appear as shown below instead of as in the patent:

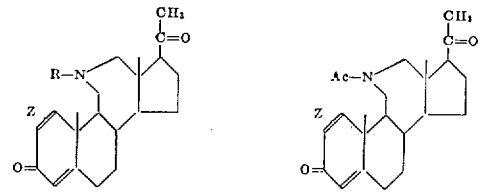

columns 1 and 2, Formulas II, III, IV, V and VI should appear as shown below instead of as in the patent:

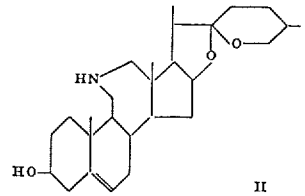

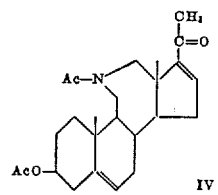
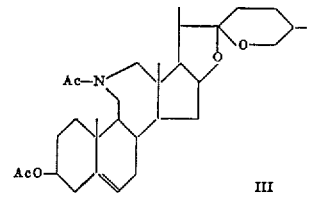

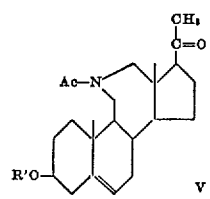
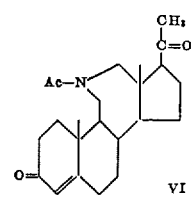

columns 3 and 4, Formulas VIII and VII should appear as shown below instead of as in the patent:

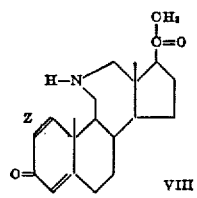

column 4, Formulas IV, IX, XI, X, XIII, XII and XIV should appear as shown below instead of as in the patent:
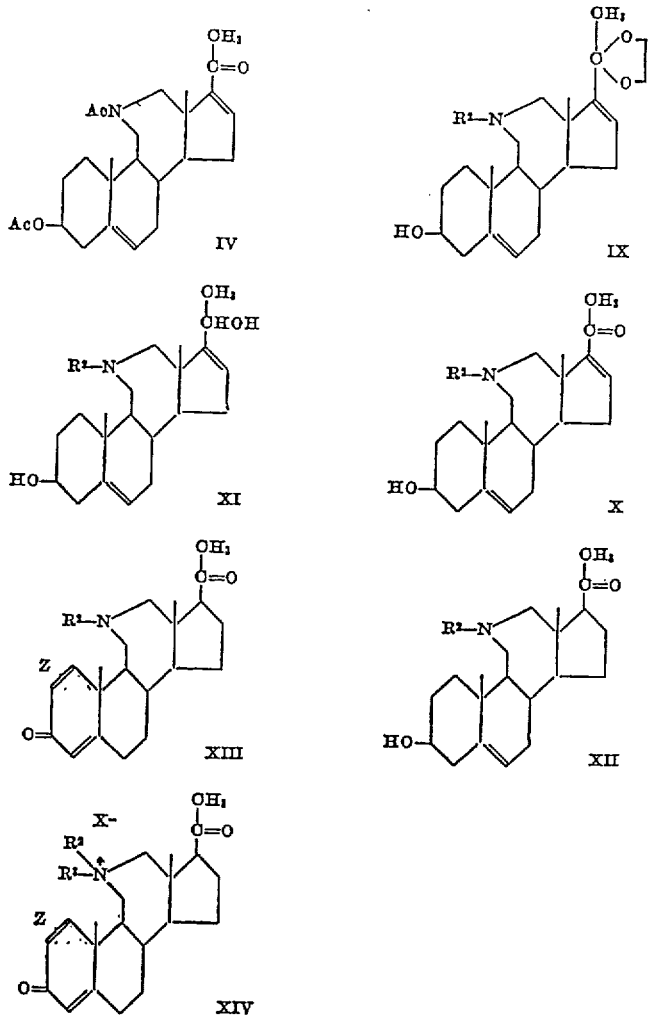
column 8, lines 41 to 52, the formula should appear as shown below instead of as in the patent:
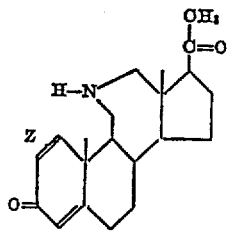
column 8, lines 58 to 68, the formula should appear as shown below instead of as in the patent:
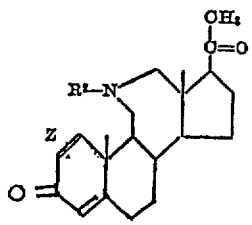

column 9, lines 5 to 14, the formula should appear as shown below instead of as in the patent:

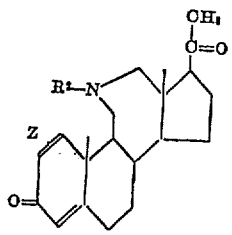

column 9, lines 26 to 36, the formula should appear as shown below instead of as in the patent:

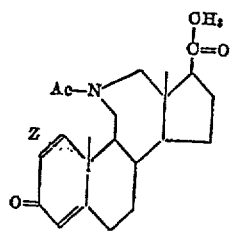

column 10, lines 7 to 17, the formula should appear as shown below instead of as in the patent:

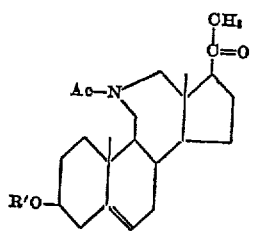

Signed and sealed this 6th day of August 1963.

[SEAL]
Attest:
ERNEST W. SWIDER,
*Attesting Officer.*

DAVID L. LADD,
*Commissioner of Patents.*

UNITED STATES PATENT OFFICE
Certificate of Correction

Patent No. 3,063,984            November 13, 1962

John A. Zderic

It is hereby certified that error appears in the above numbered patent requiring correction and that the said Letters Patent should read as corrected below.

Column 2, lines 2 to 12, the formulas should appear as shown below instead of as in the patent:

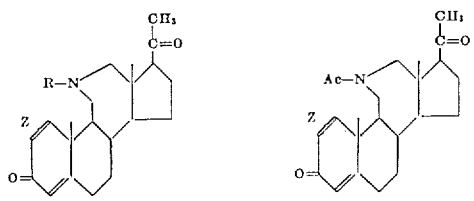

columns 1 and 2, Formulas II, III, IV, V and VI should appear as shown below instead of as in the patent:

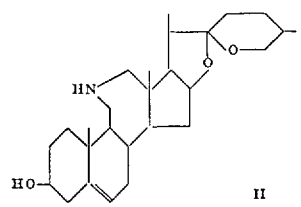

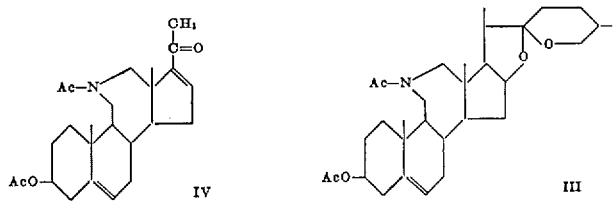

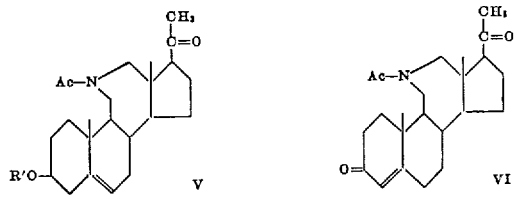

columns 3 and 4, Formulas VIII and VII should appear as shown below instead of as in the patent:

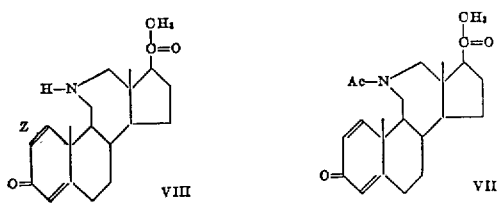

column 4, Formulas IV, IX, XI, X, XIII, XII and XIV should appear as shown below instead of as in the patent:
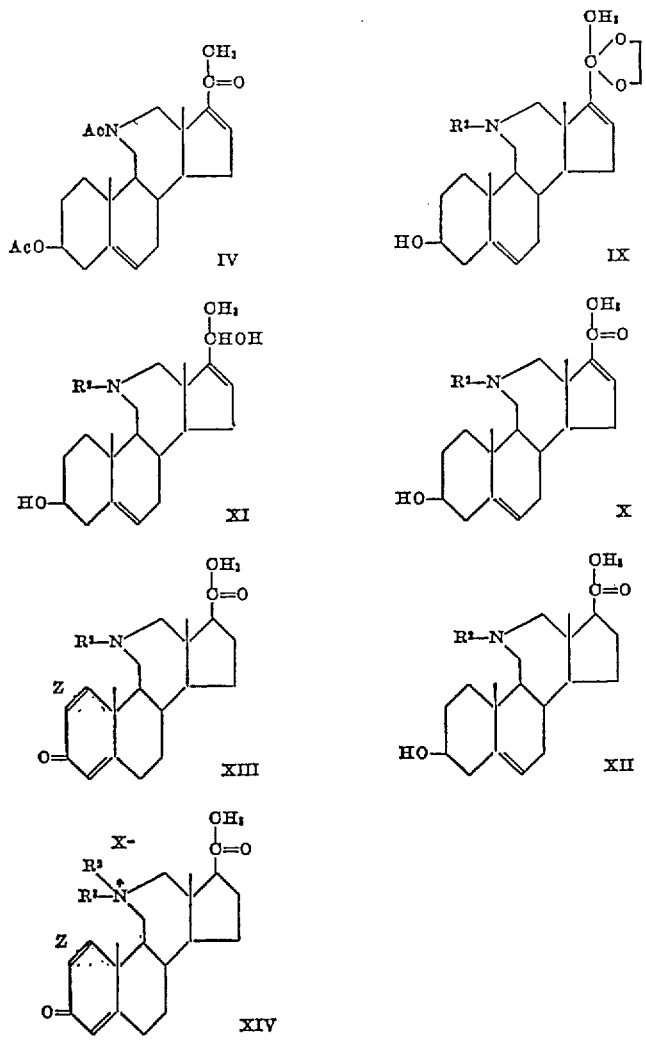
column 8, lines 41 to 52, the formula should appear as shown below instead of as in the patent:
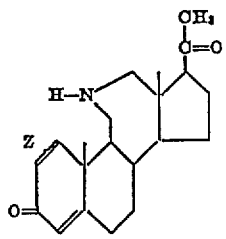
column 8, lines 58 to 68, the formula should appear as shown below instead of as in the patent:
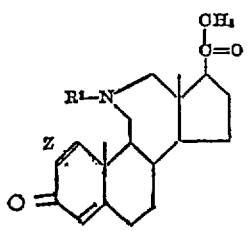

column 9, lines 5 to 14, the formula should appear as shown below instead of as in the patent:

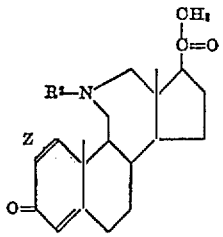

column 9, lines 26 to 36, the formula should appear as shown below instead of as in the patent:

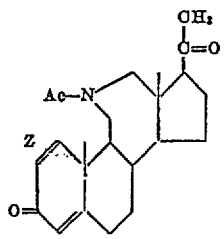

column 10, lines 7 to 17, the formula should appear as shown below instead of as in the patent:

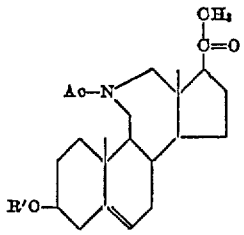

Signed and sealed this 6th day of August 1963.

[SEAL]
Attest:
ERNEST W. SWIDER,
*Attesting Officer.*

DAVID L. LADD,
*Commissioner of Patents.*